United States Patent
Corbin

(10) Patent No.: US 10,462,614 B2
(45) Date of Patent: Oct. 29, 2019

(54) GROUP SCHEDULED SENSOR DATA ACQUISITION IN A WIRELESS SENSOR SYSTEM

(71) Applicant: SIKORSKY AIRCRAFT CORPORATION, Stratford, CT (US)

(72) Inventor: Scott Alan Corbin, Port Matilda, PA (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 232 days.

(21) Appl. No.: 15/315,122

(22) PCT Filed: May 21, 2015

(86) PCT No.: PCT/US2015/031893
§ 371 (c)(1),
(2) Date: Nov. 30, 2016

(87) PCT Pub. No.: WO2015/183677
PCT Pub. Date: Dec. 3, 2015

(65) Prior Publication Data
US 2017/0099586 A1     Apr. 6, 2017

Related U.S. Application Data

(60) Provisional application No. 62/005,001, filed on May 30, 2014.

(51) Int. Cl.
*H04W 4/08*     (2009.01)
*H04W 4/38*     (2018.01)
(Continued)

(52) U.S. Cl.
CPC ............. *H04W 4/08* (2013.01); *H04L 67/12* (2013.01); *H04L 67/325* (2013.01); *H04W 4/38* (2018.02);
(Continued)

(58) Field of Classification Search
CPC .......... H04W 4/04; H04W 4/08; H04W 4/38; H04W 56/0015; H04W 72/12;
(Continued)

(56) References Cited

U.S. PATENT DOCUMENTS 6,751,248 B1   6/2004   Tan
8,189,494 B2   5/2012   Budampati et al.
(Continued)

OTHER PUBLICATIONS

Notification of Transmittal of the International Search Report for International Appln. No. PCT/US2015/031893; International Filing Date: May 21, 2015; dated Aug. 14, 2015; 6 pages.
(Continued)

*Primary Examiner* — Paul H Masur
(74) *Attorney, Agent, or Firm* — Cantor Colburn LLP

(57) ABSTRACT

A wireless sensor system includes wireless sensor nodes, each including a sensor interface that interfaces with sensing circuitry, a wireless interface to communicate with a wireless access point, at least one processor, and memory. The memory has instructions stored thereon that, when executed by the at least one processor, cause the wireless sensor node to compare a group identifier received in a message at the wireless interface with a group identifier of the wireless sensor node. Based on determining that the group identifier received matches the wireless sensor node, a start time to trigger is set in the wireless sensor node according to a start time defined in the message. A local clock of the wireless sensor node is monitored. Based on determining that the local clock has reached the start time to trigger, sensor data are acquired through the sensor interface and transmitted on the wireless interface.

13 Claims, 4 Drawing Sheets

(51) Int. Cl.
*H04L 29/08* (2006.01)
*H04W 56/00* (2009.01)
*H04W 72/12* (2009.01)
*H04W 84/18* (2009.01)

(52) U.S. Cl.
CPC ....... *H04W 56/0015* (2013.01); *H04W 72/12* (2013.01); *H04W 84/18* (2013.01)

(58) Field of Classification Search
CPC ............ H04W 72/1205; H04W 72/121; H04L 67/32; H04L 67/325
See application file for complete search history.

(56) References Cited

U.S. PATENT DOCUMENTS

| | | | |
|---|---|---|---|
| 8,194,571 B2 | 6/2012 | Herrmann et al. | |
| 8,229,486 B2 | 7/2012 | Hellstrom | |
| 8,599,822 B2 | 12/2013 | Castagnoli | |
| 2001/0024165 A1 | 9/2001 | Steen, III et al. | |
| 2006/0274644 A1 | 12/2006 | Budampati et al. | |
| 2007/0076650 A1 | 4/2007 | Manjeshwar et al. | |
| 2009/0022121 A1 | 1/2009 | Budampati et al. | |
| 2009/0210075 A1* | 8/2009 | Moriwaki | H04L 41/0654 700/28 |
| 2009/0300379 A1 | 12/2009 | Mian et al. | |
| 2011/0222515 A1 | 9/2011 | Wang et al. | |
| 2012/0188997 A1* | 7/2012 | Zakrzewski | H04J 3/0667 370/350 |
| 2013/0044661 A1 | 2/2013 | Jokimies et al. | |
| 2013/0142097 A1* | 6/2013 | Gong | H04W 72/121 370/311 |
| 2013/0258953 A1* | 10/2013 | Huang | H04W 72/0406 370/329 |
| 2013/0286957 A1* | 10/2013 | Bucknell | H04W 4/70 370/329 |
| 2013/0336205 A1* | 12/2013 | Zakrzewski | H04J 3/0658 370/328 |
| 2014/0036724 A1 | 2/2014 | Castagnoli | |
| 2014/0149079 A1* | 5/2014 | Shin | G06K 19/0717 702/187 |
| 2016/0021434 A1* | 1/2016 | Arakawa | H04Q 9/00 340/870.01 |

OTHER PUBLICATIONS

Written Opinion of the International Searching Authority for International Appln. No. PCT/US2015/031893; International Filing Date: May 21, 2015; dated Aug. 14, 2015; 5 pages.
Extended European Search Report; European Application No. 15799670. 3; dated Oct. 23, 2017; 7 Pages.

* cited by examiner

GROUP SCHEDULED SENSOR DATA ACQUISITION IN A WIRELESS SENSOR SYSTEM

CROSS REFERENCE TO RELATED APPLICATIONS

This application is a National Stage application of PCT/US2015/031893, filed May 21, 2015, which claims the benefit of U.S. Provisional Application No. 62/005,001, filed May 30, 2014, both of which are incorporated by reference in their entirety herein.

BACKGROUND OF THE INVENTION

The subject matter disclosed herein generally relates to wireless systems, and more particularly to scheduling of sensor data acquisition in a wireless sensor system.

In a wireless sensor system, wireless sensor nodes communicate with a server to provide both status information and sensor data. Communication latency within a wireless network can vary from node-to-node. Differences in signal strength, distance, noise sources, power level, and other factors can contribute to communication latency variations. Differences in latency can also be due to particular wireless protocol message transmission methods. For example, time division multiplexing, where each node has its own time slice during which communication with the node can occur, results in latency variations for a common message broadcast to all nodes. Additionally, communication latency can vary over time as environmental conditions change. Therefore, accurately anticipating and correcting for communication latency can be challenging in a wireless sensor system. Differences in communication latency can result in poor synchronization among wireless sensor nodes when using a broadcast message to initiate data acquisition at multiple wireless sensor nodes simultaneously.

BRIEF DESCRIPTION OF THE INVENTION

According to an aspect of the invention, a wireless sensor system includes a plurality of wireless sensor nodes. Each of the wireless sensor nodes includes a sensor interface that interfaces with sensing circuitry, a wireless interface to communicate with a wireless access point, at least one processor, and memory. The memory has instructions stored thereon that, when executed by the at least one processor, cause the wireless sensor node to compare a group identifier received in a message at the wireless interface with a group identifier of the wireless sensor node. Based on a determination that the group identifier received in the message matches the group identifier of the wireless sensor node, a start time to trigger sensor data acquisition is set in the wireless sensor node according to a start time defined in the message. A local clock of the wireless sensor node is monitored. Based on a determination that the local clock has reached the start time to trigger sensor data acquisition, a plurality of sensor data is acquired through the sensor interface. The sensor data are transmitted on the wireless interface.

In addition to one or more of the features described above or below, or as an alternative, further embodiments could include where the group identifier of the wireless sensor node is set based on a configuration message received at the wireless interface.

In addition to one or more of the features described above or below, or as an alternative, further embodiments could include where the group identifier of the wireless sensor node is set based on a value stored in the wireless sensor node.

In addition to one or more of the features described above or below, or as an alternative, further embodiments could include where the wireless sensor node is configurable as a member of multiple groups contemporaneously, and each of the groups has a unique group identifier in the wireless sensor system.

In addition to one or more of the features described above or below, or as an alternative, further embodiments could include where the local clock is resynchronized relative to one or more other clocks in the wireless sensor system independent of the message including the group identifier and the start time.

In addition to one or more of the features described above or below, or as an alternative, further embodiments could include where resynchronization of the local clock is performed according to a lower-level radio protocol, and the message including the group identifier and the start time is relayed according to a higher-level application protocol.

In addition to one or more of the features described above or below, or as an alternative, further embodiments could include where the message further defines a schedule of repetition of acquisition of the sensor data, and the start time to trigger sensor data acquisition is defined according to the schedule of repetition.

In addition to one or more of the features described above or below, or as an alternative, further embodiments could include where a time stamp of an actual start time of acquisition of the sensor data is returned with the sensor data.

According to other aspects of the invention, a method of group scheduled sensor data acquisition in a wireless sensor system is provided. The method includes receiving a message at a wireless sensor node of the wireless sensor system. The message includes a group identifier and a start time. The group identifier received in the message is compared with a group identifier of the wireless sensor node. Based on determining that the group identifier received in the message matches the group identifier of the wireless sensor node, a start time to trigger sensor data acquisition is set in the wireless sensor node according to a start time defined in the message. A local clock of the wireless sensor node is monitored. Based on determining that the local clock has reached the start time to trigger sensor data acquisition, a plurality of sensor data is acquired at the wireless sensor node. The sensor data are transmitted on a wireless interface of the wireless sensor node.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

In exemplary embodiments, group scheduled sensor data acquisition is provided in a wireless sensor system. Rather than immediately triggering data acquisition based on a broadcast message in the wireless sensor system, the wireless sensor nodes receive a scheduled start time to trigger sensor data acquisition. Each of the wireless sensor nodes has a respective local clock that may be periodically resynchronized. The local clock establishes a time base to trigger synchronized data acquisition across a group of wireless sensor nodes. Each wireless sensor node can belong to more than one group, where each group includes at least two wireless sensor nodes. Group membership can be assigned and modified dynamically. Alternatively, group definitions may be static. Further details are provided herein.

Figure 1:
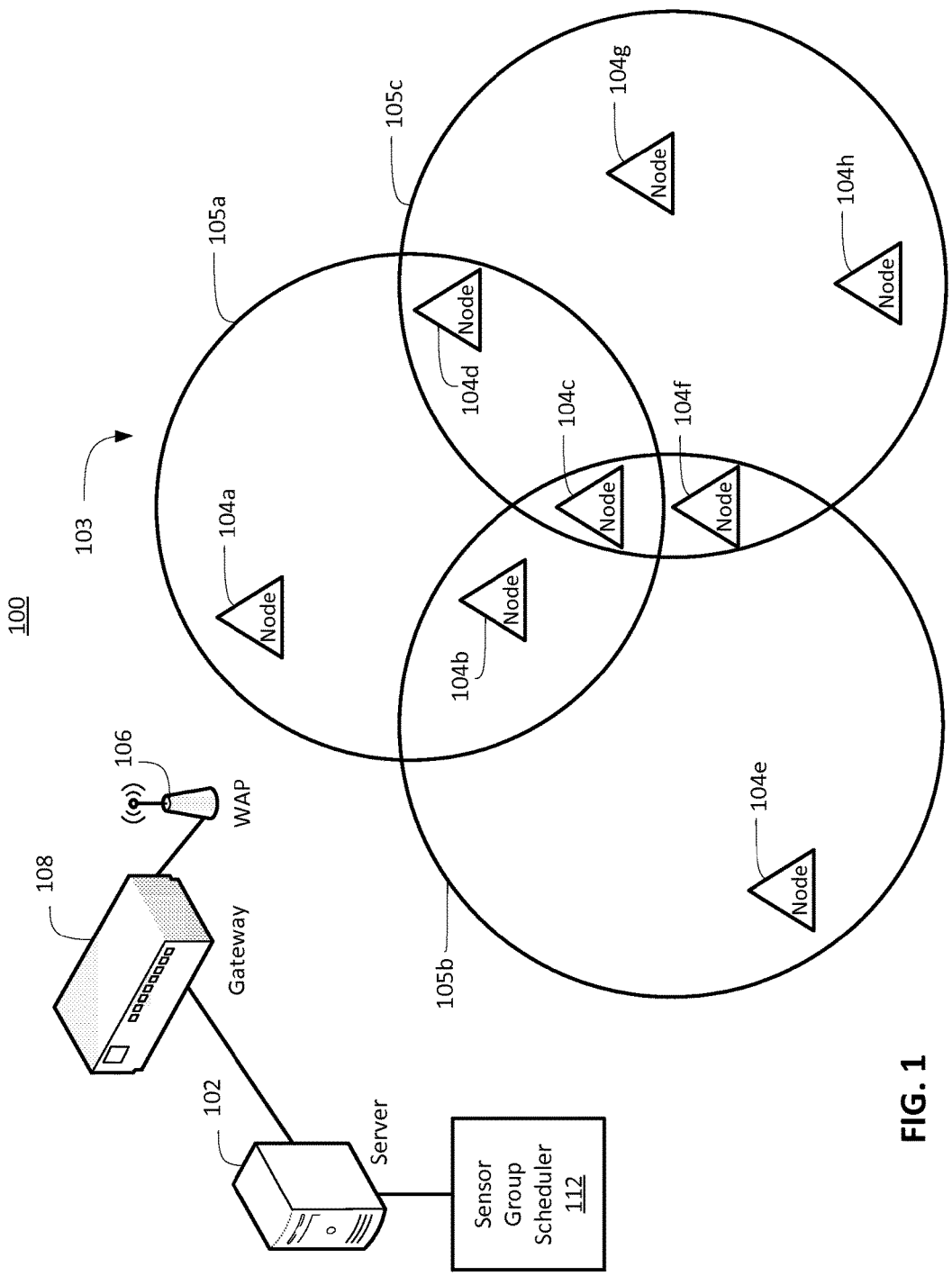
FIG. 1 schematically depicts a wireless sensor system in accordance with an embodiment.

FIG. 1 schematically depicts a wireless sensor system 103 as part of a system 100 in accordance with an embodiment. The wireless sensor system 103 includes a plurality of wireless sensor nodes 104 configured to communicate wirelessly with a wireless access point 106 of the system 100. In an exemplary embodiment, the wireless access point 106 is operably coupled to a server 102 through a gateway 108. The gateway 108 can provide protocol translation, rate conversion, fault isolation, and/or signal translation between the wireless access point 106 and the server 102. In an alternate embodiment, the wireless access point 106 is directly coupled to the server 102. The server 102 is a host system that can control configuration of the wireless sensor nodes 104, initiate actions at the wireless sensor nodes 104, and collect data from the wireless sensor nodes 104. The wireless sensor nodes 104 include or interface to sensing circuitry 110 (FIG. 2) to acquire various types of sensor data.

The server 102 can include processing circuitry, memory, communication interfaces, input/output interfaces, and other computer system hardware and software elements known in the art. In one embodiment, the server 102 executes a sensor group scheduler 112 that sends messages to schedule sensor data acquisition to groups 105 of wireless sensor nodes 104. The sensor group scheduler 112 may also dynamically define and modify membership of the groups 105. When sensor data are returned from the wireless sensor nodes 104, the sensor group scheduler 112 can make the data available on a group basis for use by various data processing algorithms (not depicted). In advanced system health monitoring algorithms, data fusion can combine multiple data sources to develop more robust and comprehensive system state analysis. Embodiments improve sensor data acquisition synchronization, which can increase time correlation accuracy across multiple wireless sensor nodes 104 in the groups 105.

In the example of FIG. 1, there are three groups 105 of the wireless sensor nodes 104 depicted, although it will be understood that any number of wireless sensor nodes 104 and groups 105 can be included in the wireless sensor system 103. As depicted in FIG. 1, group 105a includes wireless sensor nodes 104a, 104b, 104c, and 104d. Group 105b includes wireless sensor nodes 104b, 104c, 104e, and 104f. Group 105c includes wireless sensor nodes 104c, 104d, 104f, 104g, and 104h. Accordingly, it can be seen that the wireless sensor nodes 104 may belong to multiple groups 105. For example, wireless sensor node 104b is a member of groups 105a and 105b; wireless sensor node 104d is a member of groups 105a and 105c; wireless sensor node 104f is a member of groups 105b and 105c; and wireless sensor node 104c is a member of groups 105a, 105b, and 105c. Various criteria can be used to assign particular instances of the wireless sensor nodes 104 to particular groups 105. For instance, group 105a may be associated with a particular component or subsystem, such as a gear box, while groups 105b and 105c may be associated with an engine and a rotor of a vehicle.

In some applications, particular wireless sensor nodes 104 may have applicability to multiple groups 105. For instance, a current ambient temperature or pressure value may be of use in diagnostic algorithms associated with multiple components or subsystems. As another example, an accelerometer installed at a particular orientation may observe vibration data associated with multiple components or subsystems. The wireless sensor system 103 can be implemented in an industrial application, a single vehicle application, a multi-vehicle application, and other environments that benefit from synchronized wireless sensor data acquisition. Group membership in the example of FIG. 1 is summarized in Table 1. Other combinations are contemplated, including a super-group that synchronizes all of the wireless sensor nodes 104.

TABLE 1

Example wireless sensor node to group mapping

| Wireless Sensor Node | Group 105a | Group 105b | Group 105c |
|---|---|---|---|
| 104a | X | | |
| 104b | X | X | |
| 104c | X | X | X |
| 104d | X | | X |
| 104e | | X | |
| 104f | | X | X |
| 104g | | | X |
| 104h | | | X |

Figure 2:
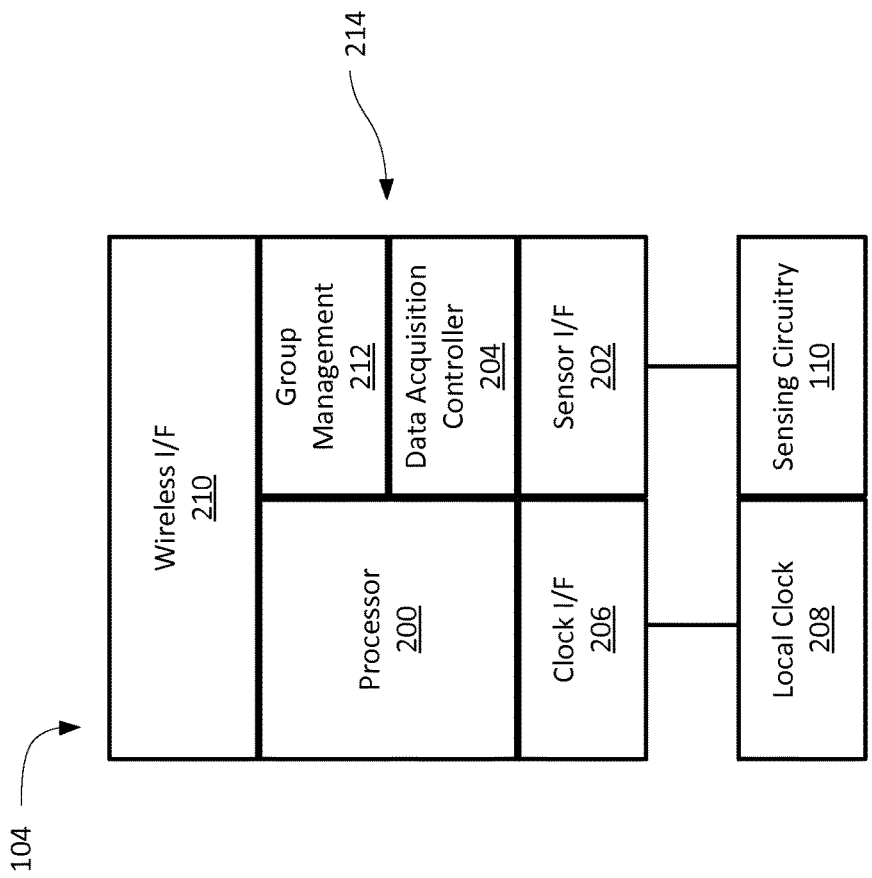
FIG. 2 schematically depicts a wireless sensor node in accordance with an embodiment.

FIG. 2 schematically depicts an instance of a wireless sensor node 104 of FIG. 1 in accordance with an embodiment. In the example of FIG. 2, the wireless sensor node 104 includes a sensor interface 202 that interfaces with sensing circuitry 110. The wireless sensor node 104 also includes a data acquisition controller 204 to acquire sensor data via the sensor interface 202. A clock interface 206 can read and resynchronize a local clock 208 of the wireless sensor node 104. The local clock 208 can include an oscillator circuit and a phase-locked loop for timing adjustments. Time values can be managed as time-of-day values, including extended values for longer-term tracking, such as day/date, month, year, etc. A wireless interface 210 enables communication with the wireless access point 106 of FIG. 1.

The sensing circuitry 110 can support acquisition of a variety of sampled inputs. The sensing circuitry 110 may also support a higher rate or a lower rate of data acquisition depending upon the type of parameter being monitored. For instance, temperature and pressure values can be relatively low rate of change parameters without a substantially cyclic component, and thus can be sampled relatively infrequently after sensor data acquisition is triggered. In contrast, vibration data values from an accelerometer include cyclic frequency components and must be sampled at least twice the rate of the highest frequency of interest. For cyclic data, a sampled set of sensor data may be collected over a period of time after sensor data acquisition is triggered in order to obtain multiple cycles of a substantially continuous waveform to support frequency domain processing, such as a Fourier transform. For instance, if the sensing circuitry 110 is an accelerometer, the wireless sensor node 104 may acquire 2,048 samples of sensor data before sending the sensor data back to the wireless access point 106 of FIG. 1. The wireless sensor node 104 can make sure that a full buffer of samples (e.g., all 2,048 samples) has been acquired before sending the sensor data back to the wireless access point 106 of FIG. 1. The data samples may be divided into multiple sensor data messages.

The wireless sensor node 104 also includes group management logic 212 that can manage membership in one or more of the groups 105 of FIG. 1 for the wireless sensor node 104 to trigger actions based on messages received on the wireless interface 210. The group management logic 212 can set a group identifier of the wireless sensor node 104 based on a configuration message received at the wireless interface 210. Alternatively, the group identifier of the wireless sensor node 104 is set based on a value stored in the wireless sensor node 104, e.g., in non-volatile memory or based on switches, jumpers, and the like. The group management logic 212 can determine that a received message is targeting the wireless sensor node 104, and can monitor the clock interface 206 to determine when to trigger the data acquisition controller 204 to acquire sensor data from the sensing circuitry 110 via the sensor interface 202. The group management logic 212 can trigger the data acquisition controller 204 to acquire sensor data at a single specific start time or as a recurring event, e.g., hourly, daily, weekly, etc. The group management logic 212 can also schedule return of the sensor data and may include a time stamp from the clock interface 206 that captures an actual start time of acquisition of the sensor data to return with the sensor data.

The data acquisition controller 204 and group management logic 212 can be embodied as instructions stored in memory 214 that can be executed by at least one processor 200 to cause the wireless sensor node 104 to perform functions of the data acquisition controller 204 and group management logic 212. Processor 200 can be any type or combination of computer processors, such as a microprocessor, microcontroller, digital signal processor, application specific integrated circuit, programmable logic device, and/or field programmable gate array. The memory 214 is an example of a non-transitory computer readable storage medium tangibly embodied in the wireless sensor node 104 including executable instructions stored therein, for instance, as firmware.

The wireless sensor node 104 may implement a protocol stack for wireless communication, when communicating with the wireless access point 106 of FIG. 1. One example of a protocol stack is the Internet protocol suite that defines a physical/link layer, an Internet layer, a transport layer, and an application layer. In the example of FIG. 2, the group management logic 212 operates at the application layer to control sensor data acquisition start times and reporting of sensor data from the wireless sensor node 104 based on group identification. The local clock 208 can be resynchronized relative to one or more other clocks in the wireless sensor system 103 of FIG. 1 independent of a start time message that includes a group identifier and start time. Resynchronization of the local clock 208 may be performed according to a lower-level radio protocol layer, e.g., a protocol of a physical/link layer. In contrast, a start message that includes the group identifier and start time may be relayed according to a higher-level application protocol layer, where communication in the wireless sensor system 103 of FIG. 1 is performed according to a known wireless communication protocol stack.

Figure 3:
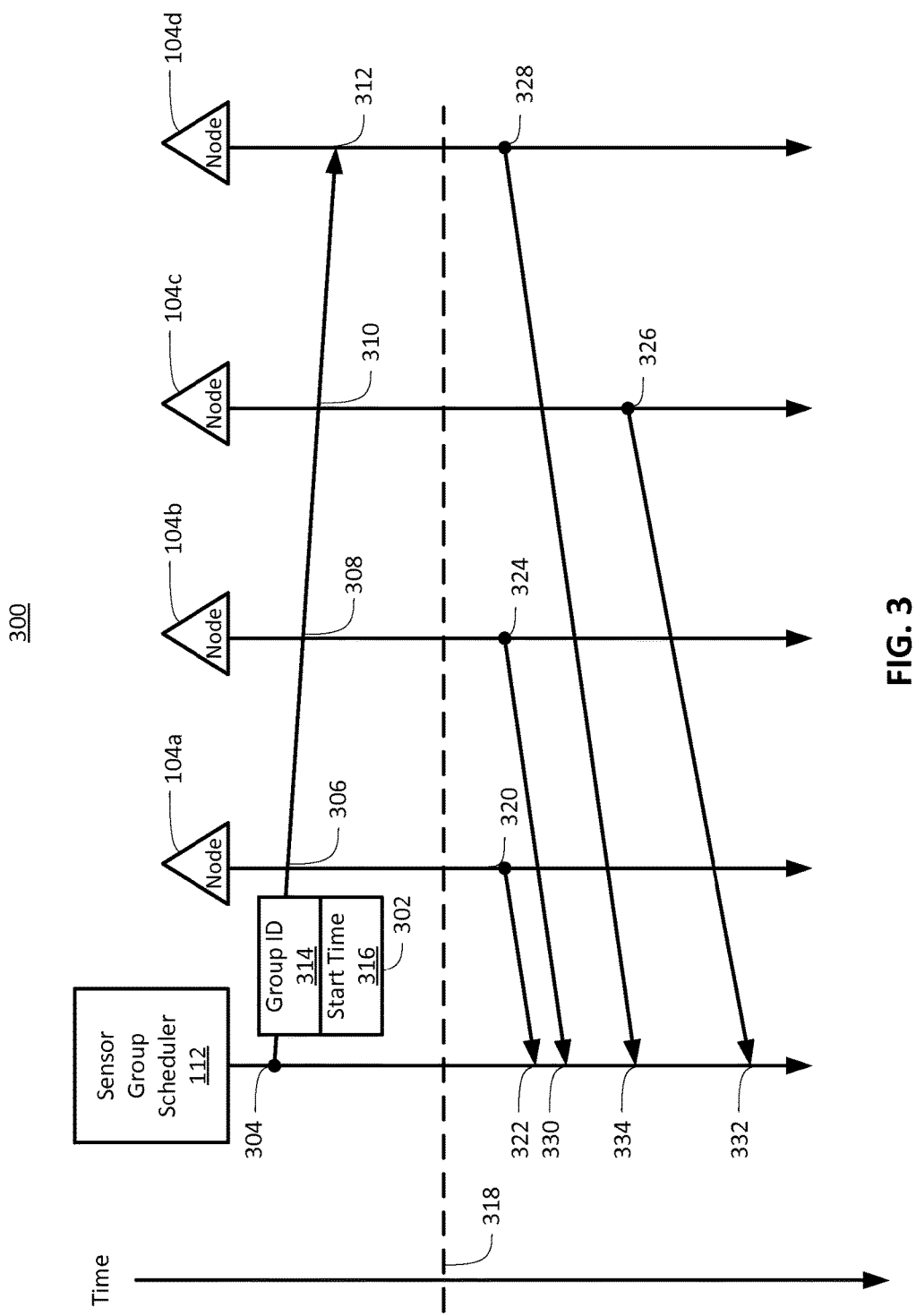
FIG. 3 depicts an example timing diagram in accordance with an embodiment.

FIG. 3 depicts an example timing diagram 300 in accordance with an embodiment. The timing diagram 300 illustrates relative timing of the sensor group scheduler 112 of FIG. 1 and wireless sensor nodes 104a, 104b, 104c, and 104d of group 105a of FIG. 1. Communication latency between the sensor group scheduler 112 and the wireless sensor nodes 104a, 104b, 104c, and 104d can vary such that a message 302 sent at a first time 304 arrives at the wireless sensor nodes 104a, 104b, 104c, and 104d at times 306, 308, 310, 312 respectively. Each of the times 306-312 may be different values. The message 302 defines a group identifier 314 and a start time 316. Each of the wireless sensor nodes 104a, 104b, 104c, and 104d sets a start time 318 to trigger sensor data acquisition based on the start time 316 defined in the message 302. Each of the wireless sensor nodes 104a, 104b, 104c, and 104d also monitors its respective local clock 208 (FIG. 2) and based on reaching the start time 318 to trigger sensor data acquisition, sensor data are acquired at the wireless sensor nodes 104a, 104b, 104c, and 104d. The wireless sensor nodes 104a, 104b, 104c, and 104d may complete sensor data acquisition at different times depending upon sensor type and localized timing variations.

In the example of FIG. 3, the wireless sensor node 104a transmits sensor data in one or more return messages at time 320, which are received by the sensor group scheduler 112 at time 322. Similarly, the wireless sensor nodes 104b, 104c, and 104d transmit sensor data in return messages at times 324, 326, and 328, which are received by the sensor group scheduler 112 at times 330, 332, and 334 respectively. Return messages can include a group identifier, a wireless sensor node identifier, an actual start time of acquisition, and the sensor data, as the return messages from various groups 105 of FIG. 1 and wireless sensor nodes 104 of FIG. 1 may be received in any order.

Figure 4:
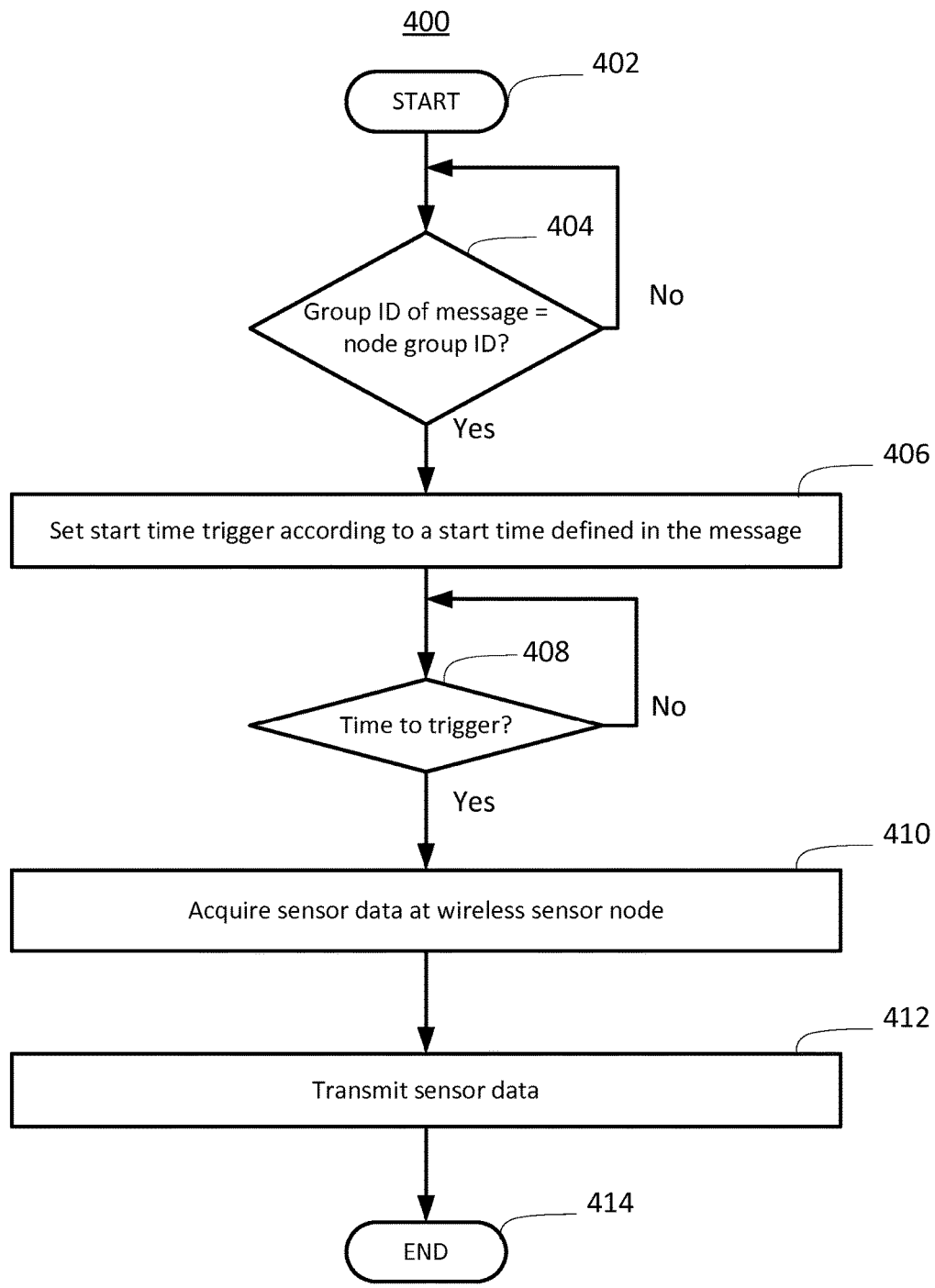
FIG. 4 depicts a process for group scheduled sensor data acquisition in a wireless sensor system in accordance with an embodiment.

FIG. 4 depicts a process 400 for group scheduled sensor data acquisition in a wireless sensor system in accordance with an embodiment. The process 400 as depicted in FIG. 4 can include additional elements beyond those depicted in FIG. 4 and may be applicable to elements as described in reference to FIGS. 1-3. For purposes of explanation, the process 400 is described in reference to FIGS. 1-4.

At block 402, the process 400 begins. A message, such as message 302, is received at a wireless sensor node 104 of the wireless sensor system 103. The message 302 can include a group identifier 314 and a start time 316. At block 404, the group identifier 314 received in the message 302 is compared with a group identifier of the wireless sensor node 104. The comparison may be performed by the group management logic 212. If the group identifier 314 received in the message 302 does not match the wireless sensor node 104, the message 302 may be ignored or discarded, and the process 400 continues monitoring for messages at block 404. If the group identifier 314 received in the message 302 matches the wireless sensor node 104, the process 400 continues to block 406.

At block 406, a start time 318 to trigger sensor data acquisition in the wireless sensor node 104 is set according to the start time 316 defined in the message 302. At block 408, a local clock 208 of the wireless sensor node 104 is monitored to determine whether the local clock 208 has reached the start time 318 to trigger sensor data acquisition. If it is not yet time to trigger, the process 400 remains at block 408. Based on determining that the local clock 208 has reached the start time 318 to trigger sensor data acquisition at block 408, the process 400 advances to block 410. At block 410, a plurality of sensor data is acquired at the wireless sensor node 104. At block 412, the sensor data are transmitted on the wireless interface 210 of the wireless sensor node 104 to return the sensor data to the server 102. A time stamp of an actual start time of acquisition of the sensor data may be returned with the sensor data.

As previously described, the group identifier of the wireless sensor node 104 may be set based on a configuration message received by the wireless sensor node 104, for instance, from the sensor group scheduler 112. Alternatively, the group identifier of the wireless sensor node 104 can be set based on a value stored in the wireless sensor node 104. The wireless sensor node 104 may be configurable as a member of multiple groups 105 contemporaneously, where each of the groups 105 has a unique group identifier in the wireless sensor system 103. The local clock 208 can be resynchronized relative to one or more other clocks in the wireless sensor system 103 independent of the message 302 that includes the group identifier 314 and the start time 316. The message 302 may also define a schedule of repetition of acquisition of the sensor data, and the start time 318 to trigger sensor data acquisition can be defined according to the schedule of repetition such that synchronous sensor data acquisition occurs repeatedly on a scheduled periodic basis.

Technical effects include establishing groups of wireless sensor nodes and sending a start time message defining a group identifier and a start time to initiate synchronous data acquisition for the wireless sensor nodes of the identified group.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A wireless sensor system comprising a plurality of wireless sensor nodes, each of the wireless sensor nodes comprising:
    a sensor interface that interfaces with sensing circuitry;
    a wireless interface to communicate with a wireless access point;
    at least one processor; and
    memory having instructions stored thereon that, when executed by the at least one processor, cause the wireless sensor node to:
    receive a message at the wireless sensor node including a group identifier and a start time;
    compare the group identifier received in a message with a group identifier of the wireless sensor node;
    based on a determination that the group identifier received in the message matches the group identifier of the wireless sensor node, set a start time to trigger sensor data acquisition in the wireless sensor node according to the start time defined in the message;
    monitor a local clock of the wireless sensor node;
    resynchronize the local clock relative to one or more other clocks in the wireless sensor system independent of the message, wherein the local clock is resynchronized according to a first protocol and the message is relayed according to a second protocol;
    based on a determination that the local clock has reached the start time to trigger sensor data acquisition, acquire a plurality of sensor data through the sensor interface; and
    transmit the sensor data on the wireless interface.

2. The wireless sensor system of claim 1, wherein the group identifier of the wireless sensor node is set based on a configuration message received at the wireless interface.

3. The wireless sensor system of claim 1, wherein the group identifier of the wireless sensor node is set based on a value stored in the wireless sensor node.

4. The wireless sensor system of claim 1, wherein the wireless sensor node is configurable as a member of multiple groups contemporaneously, each of the groups having a unique group identifier in the wireless sensor system.

5. The wireless sensor system of claim 1, wherein the first protocol is a lower-level radio protocol and the second protocol is a higher-level application protocol.

6. The wireless sensor system of claim 1, wherein the message further defines a schedule of repetition of acquisition of the sensor data, and the start time to trigger sensor data acquisition is defined according to the schedule of repetition.

7. The wireless sensor system of claim 1, wherein a time stamp of an actual start time of acquisition of the sensor data is returned with the sensor data.

8. A method of group scheduled sensor data acquisition in a wireless sensor system, the method comprising:
    receiving a message at a wireless sensor node of the wireless sensor system, the message comprising a group identifier and a start time;
    comparing the group identifier received in the message with a group identifier of the wireless sensor node;
    based on determining that the group identifier received in the message matches the group identifier of the wireless sensor node, setting a start time to trigger sensor data acquisition in the wireless sensor node according to a start time defined in the message;
    monitoring a local clock of the wireless sensor node;
    resynchronizing the local clock relative to one or more other clocks in the wireless sensor system independent of the message comprising the group identifier and the start time, wherein the resynchronization is performed according to a first protocol and the message is relayed according to a second protocol;
    based on determining that the local clock has reached the start time to trigger sensor data acquisition, acquiring a plurality of sensor data at the wireless sensor node; and
    transmitting the sensor data on a wireless interface of the wireless sensor node.

9. The method of claim 8, wherein the group identifier of the wireless sensor node is set based on a configuration message received by the wireless sensor node.

10. The method of claim 8, wherein the group identifier of the wireless sensor node is set based on a value stored in the wireless sensor node.

11. The method of claim 8, wherein the wireless sensor node is configurable as a member of multiple groups contemporaneously, each of the groups having a unique group identifier in the wireless sensor system.

12. The method of claim 8, wherein the message further defines a schedule of repetition of acquisition of the sensor data, and the start time to trigger sensor data acquisition is defined according to the schedule of repetition.

13. The method of claim 8, wherein a time stamp of an actual start time of acquisition of the sensor data is returned with the sensor data.

\* \* \* \* \*